United States Patent
Beuterbaugh et al.

(10) Patent No.: US 11,084,976 B2
(45) Date of Patent: Aug. 10, 2021

(54) METHOD AND PROCESS OF USE OF BINARY COMPOSITIONS FOR ACIDIZING SUBTERRANEAN FORMATIONS

(71) Applicant: Halliburton Energy Services, Inc., Houston, TX (US)

(72) Inventors: Aaron M. Beuterbaugh, Spring, TX (US); Renata Vieira Pires, Rio de Janeiro (BR); Enrique Antonio Reyes, Tomball, TX (US); Victor Daniel Escobar, The Woodlands, TX (US); Travis Hope Larsen, Houston, TX (US); Cesar Edmundo Meza, Pearland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 124 days.

(21) Appl. No.: 16/193,553

(22) Filed: Nov. 16, 2018

(65) Prior Publication Data
US 2020/0157413 A1 May 21, 2020

(51) Int. Cl.
*E21B 43/26* (2006.01)
*C09K 8/74* (2006.01)
*E21B 43/24* (2006.01)
*E21B 33/138* (2006.01)
(Continued)

(52) U.S. Cl.
CPC ............ *C09K 8/74* (2013.01); *E21B 21/003* (2013.01); *E21B 33/138* (2013.01); *E21B 37/00* (2013.01); *E21B 43/2405* (2013.01); *E21B 43/26* (2013.01)

(58) Field of Classification Search
CPC ....... C09K 8/74; E21B 21/003; E21B 33/138; E21B 33/38; E21B 37/00; E21B 43/2405; E21B 43/26
See application file for complete search history.

(56) References Cited

U.S. PATENT DOCUMENTS 9,920,606 B2 3/2018 Jiang et al.
2009/0038799 A1 2/2009 Garcia-Lopez de Victoria et al.
(Continued)

FOREIGN PATENT DOCUMENTS

| CN | 106285612 A | 1/2017 |
| WO | 2016164327 A1 | 10/2016 |
| WO | 2017052537 A1 | 3/2017 |

OTHER PUBLICATIONS

Aaron M. Beuterbaugh et al. "Tandem Acidizing-Corrosion Inhibition with Low Risk-Low Toxicity Chelant"; SPE-173740-MS; Society of Petroleum Engineers, Apr. 13-15, 2015; 10 pp.
(Continued)

*Primary Examiner* — Silvana C Runyan
(74) *Attorney, Agent, or Firm* — Thomas Rooney; Baker Botts L.L.P.

(57) ABSTRACT

Methods and systems for protecting acid-reactive surfaces, particularly during subterranean treatment operations in which acids are used. In some embodiments, the methods include: providing a fluid additive including an organic compound and a base, wherein the organic compound includes a phosphonoalkyl moiety; providing an acid or acid generating source; mixing at least the fluid additive and the acid or acid generating source to form a treatment fluid; and introducing the treatment fluid into at least a portion of a subterranean formation.

16 Claims, 4 Drawing Sheets

(51) Int. Cl.
*E21B 37/00* (2006.01)
*E21B 21/00* (2006.01)

(56) References Cited

U.S. PATENT DOCUMENTS

| | | | |
|---|---|---|---|
| 2015/0141302 A1* | 5/2015 | Nasr-El-Din | C09K 8/52 |
| | | | 507/241 |
| 2015/0330197 A1 | 11/2015 | Brannon et al. | |
| 2016/0298024 A1 | 10/2016 | Panga et al. | |
| 2016/0340516 A1* | 11/2016 | Beuterbaugh | C09K 8/03 |
| 2017/0066957 A1 | 3/2017 | LaBlanc et al. | |
| 2017/0218261 A1 | 8/2017 | Nguyen | |
| 2017/0275527 A1* | 9/2017 | LaBlanc | C09K 8/76 |
| 2018/0258342 A1* | 9/2018 | Nguyen | C09K 8/887 |
| 2020/0102492 A1* | 4/2020 | Reyes | C09K 8/68 |

OTHER PUBLICATIONS

Christopher S. Daeffler et al. "Improving Wormholing Efficiency in Carbonates with a Novel System Based on Hydrochloric Acid"; SPE-189540-MS; Society of Petroleum Engineers, Feb. 7-9, 2018; 8 pp.

Mohammed Sayed et al. "A Low-Viscosity Retarded Acid System for Stimulation of High-Temperature Deep Wells"; OTC-28838-MS; Aramco Services Company, Apr. 30-May 3, 2018; 20 pp.

Amy J. Cairns et al. "Targeting Enhanced Production through Deep Carbonate Stimulation: Stabilized Acid Emulsions" SPE-178967-MS; Society of Petroleum Engineers, Feb. 24-26, 2016; 24 pp.

* cited by examiner

METHOD AND PROCESS OF USE OF BINARY COMPOSITIONS FOR ACIDIZING SUBTERRANEAN FORMATIONS

BACKGROUND

The present disclosure relates to methods, systems, and compositions for relating to acid-promoted processes during subterranean treatment operations.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

Acidic treatment fluids are frequently used in conducting various subterranean treatment operations. Illustrative uses of acidic treatment fluids during subterranean treatment operations include, for example, matrix acidizing of siliceous and/or non-siliceous formations, scale dissolution and removal operations, gel breaking, acid fracturing, and the like. When acidizing a non-siliceous material, such as a carbonate material, mineral acids such as hydrochloric acid often may be sufficient to affect dissolution. Organic acids such as formic acid or acetic acid also may be used in a similar manner to hydrochloric acid when dissolving a non-siliceous material. Siliceous materials, in contrast, are only readily dissolvable using hydrofluoric acid, optionally in combination with other mineral acids or organic acids. Similar considerations apply when dissolving scale.

Although carbonate minerals can be readily dissolved with both mineral acids and organic acids, there are operations like acidizing treatments of subterranean formations in which the acid's reactivity with carbonate minerals is often excessive and may lead to various undesirable effects. For example, excessively rapid reaction of a carbonate mineral with an acid can lead to wellbore erosion and excessive or inefficient acid reaction (spending) in the near wellbore area or reservoir, rather than the desired wormhole formation or the creation of other conductive channels or asperities in the formation matrix in order to increase, or restore, its permeability. As used herein, the term "wormhole" refers to a channel generated in the matrix of a subterranean formation that positively contributes to increased incremental permeability. Mineral scaling may also become problematic when a carbonate mineral is reacted with an acid. The reaction of mineral and organic acids with soft and friable matrices, particularly at elevated formation temperatures, can often occur too rapidly and can lead to undesirable matrix deconsolidation or severe erosion. Finally, when using an acid to break a gel or to remove an acid-degradable filter cake within a wellbore, reactivity issues of the formation matrix may need to be taken into account in choosing an appropriate treatment protocol.

BRIEF DESCRIPTION OF THE DRAWINGS

Some specific embodiments of the disclosure may be understood by referring, in part, to the following description and the accompanying drawings.

While embodiments of this disclosure have been depicted and described and are defined by reference to certain embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure involving wellbores may be applicable to horizontal, vertical, deviated, or otherwise nonlinear wellbores in any type of subterranean formation. Embodiments may be applicable to injection wells, monitoring wells, and production wells, including hydrocarbon or geothermal wells.

The present disclosure relates to methods, systems, and compositions for acid-promoted processes, and, more specifically, to methods for protecting acid-reactive surfaces, particularly during subterranean treatment operations in which acids are used. Excessive reactivity of some acid-reactive substances, particularly those containing an acid-reactive surface, may preclude contacting the acid-reactive surface with an acid for any significant length of time. Such excessive reactivity may be particularly problematic in subterranean treatment operations, where there may be issues of wellbore damage, ineffective stimulation, and combinations thereof. In addition, the high reactivity of acids with some acid-reactive surfaces can preclude delivery of the acid to a wellbore location where the acid's presence is more desired. For example, when low permeability formations are encountered and there is an insufficient rate of introduction of the acid into the formation (e.g., via pumping at or close to the optimum injection rate), or when screens or slotted liners are present, it may be difficult to properly place an acid due to its premature reaction with another acid-reactive material. Highly permeable thief zones also may preclude placement of an acid into a desired location within a subterranean formation (e.g., a wellbore penetrating the subterranean formation).

In certain embodiments, the methods of the present disclosure may comprise providing or forming a fluid additive comprising an organic compound and a base, wherein the organic compound comprises a phosphonoalkyl moiety. The fluid additives of the present disclosure, inter alia, may protect acid-reactive surfaces by reducing or preventing excessive or undesired interaction with said surface by acids used for treatment. Without intending to be limited to any particular theory or mechanism, it is believed that the fluid additives of the present disclosure may protect the acid-reactive surfaces by depositing a protective coating onto the surface that inhibits excessive or undesired interactions with the surface. Suitable organic compounds comprising a phosphonoalkyl moiety may include, but are not limited to, N-(phosphonoalkyl)iminodiacetic acids; N-(carboxymethyl)-N-(phosphonomethyl)¬glycine; glycine, N,N'-1,2-ethanediylbis(N-(phosphonomethyl); glyphosine; aminotrimethylene phosphonic acid; sodium aminotris (methylenephosphonate); N-(2-hydroxyethyl)imino¬bis (methylphosphonic acid); phosphonic acid, P,P'-((2-propen-1-ylimino)bis(methylene))bis-; phosphonic acid, P,P',P''-(nitrilotris(methylene))tris-; (nitrilotris(methylene)) trisphosphonic acid; ((methylimino)dimethylene) bisphosphonic acid; phosphonic acid, P,P',P''',P''''-(oxybis(2, 1-ethane-diylnitrilobis(methylene))tetrakis-; ((propylimino) bis(methylene))diphosphonic acid; phosphonic acid; P,P',P''-(nitrilotris(methylene))tris-; (ethylenedinitrilo)-tetramethylenephosphonic acid; ethylenebis (nitrilodimethylene)tetraphosphonic acid; (ethylenebis (nitrilobis¬(methylene)))-tetrakisphosphonic acid; tetrasodium tetrahydrogen (ethane-1,2-diylbis(nitrilobis¬(methylene)))-tetrakisphosphonate; 6-(bis(phosphonomethyl)amino)hexanoic acid; (phenyl¬methyl)imino)-bis (methylene)bisphosphonic acid; a sodium, potassium, or ammonium salt of any group member herein, and any mixtures thereof.

A wide variety of acid-reactive surfaces or substances may be treated and/or protected using the fluid additives of the present disclosure. In certain embodiments, the acid-reactive surface may comprise a metal, a metal salt, a mineral (particularly a carbonate mineral), an acid-degradable polymer, or the like. In some embodiments, the acid-reactive surface may be present in a wellbore penetrating a portion of a subterranean formation during a subterranean treatment operation, such as, for example, an acidizing operation. In some embodiments, the acid-reactive surface may be present when degrading a gel or a filter cake with acid following a drilling operation. In other embodiments, the acid-reactive surface may be natively present or naturally occurring in the wellbore. In still other embodiments, the acid-reactive surface may have been placed in the wellbore during a prior or concurrent subterranean treatment operation, such as during placement of a fluid loss additive. In certain embodiments, the acid-reactive surface may comprise, for example, a matrix comprising the subterranean formation, at least a portion of a particulate pack (e.g., a proppant pack or a gravel pack), or at least a portion of a metal tool that is present in the wellbore.

In certain embodiments, the organic compound comprising a phosphonoalkyl moiety may be an N-(phosphonoalkyl)iminodiacetic acid. In some embodiments, the N-(phosphonoalkyl)iminodiacetic acid may be supplied as a solid compound. The solid form of most N-(phosphonoalkyl)iminodiacetic acids are believed to have limited solubility in water. In particular, it is expected that most of the solid forms of N-(phosphonoalkyl)iminodiacetic acids have a solubility of less than or equal to about 0.5% weight/volume ("w/v"). In certain embodiments, the solubility of the N-(phosphonoalkyl)iminodiacetic acid may be increased. In some embodiments, the methods of the present disclosure may include partially or entirely neutralizing the N-(phosphonoalkyl)iminodiacetic acid using a base. Without intending to be limited to any particular theory or mechanism, it is believed that at least partially neutralizing the N-(phosphonoalkyl)iminodiacetic acid to create an organic salt derivative thereof may increase the solubility of the N-(phosphonoalkyl)iminodiacetic acid in water. In certain embodiments, the solubility of the organic salt derivative of the N-(phosphonoalkyl)iminodiacetic acid may be greater than or equal to about 55% w/v. In some embodiments, the solubility of the organic salt derivative of the N-(phosphonoalkyl)iminodiacetic acid may be greater than or equal to about 60% w/v. In other embodiments, the solubility of the organic salt derivative of the N-(phosphonoalkyl)iminodiacetic acid may be greater than or equal to about 65% w/v. In still other embodiments, the solubility of the organic salt derivative of the N-(phosphonoalkyl)iminodiacetic acid may be greater than or equal to about 70% w/v.

In certain embodiments, the N-(phosphonoalkyl)iminodiacetic acid used in forming the protective coatings may have the following structure:

wherein n is an integer ranging between 1 and about 20. In some embodiments, the N-(phosphonoalkyl)iminodiacetic acid may be N-(phosphonomethyl)iminodiacetic acid ("PMIDA"), in which n is 1. In other embodiments, n may range between 1 and about 5, or between about 5 and about 20, or between about 5 and about 15, or between about 10 and about 20. In some embodiments, the longer chain lengths, wherein n is between about 5 and about 20, may lessen the solubility of the N-(phosphonoalkyl)iminodiacetic acid or any salt thereof, among other reasons, to promote formation of a protective coating. In some embodiments, additional functionality also may be introduced to the N-(phosphonoalkyl)iminodiacetic acid in order to further tailor its solubility, pKa values, and/or biodegradation rate, for example.

In some embodiments, a fluid additive may be created by at least partially neutralizing the organic compound comprising a phosphonoalkyl moiety (e.g. N-(phosphonoalkyl) iminodiacetic acid) with a base to form an aqueous mixture of an organic salt derivative of the organic compound comprising a phosphonoalkyl moiety. For example, in embodiments where the organic compound comprising a phosphonoalkyl moiety is an N-(phosphonoalkyl)iminodiacetic acid, and, more specifically, is PMIDA, the following reaction may occur:

As shown in the reaction above, in certain embodiments, the base may be a Brønsted base. In some embodiments, the base may be an alkali hydroxide, e.g., MOH in the reaction above, wherein M may be selected from the group consisting of lithium, sodium, potassium, rubidium, and cesium. In other embodiments, the base may be ammonium hydroxide. For example, in embodiments where the base is ammonium hydroxide, M is $NH_4^+$. In still other embodiments, the base may be an alky ammonium hydroxide. For example, in embodiments where the base is tetramethylammonium hydroxide, M is $N(CH_3)_4^+$. In certain embodiments, the reaction above may be carried out by adding the organic compound comprising a phosphonoalkyl moiety to an excess volume or molar excess of the base. It is believed that adding the organic compound comprising a phosphonoalkyl moiety to the base instead of adding the base to the organic compound comprising a phosphonoalkyl moiety may result in a greater percent solubility of the organic salt derivative of the organic compound comprising a phosphonoalkyl moiety in water.

As would be understood by a person of ordinary skill in the art, many advantages, only some of which are alluded to herein, may be provided by the methods of the present disclosure for generating a fluid additive. For example, the methods of the present disclosure may provide a mechanism to utilize solid additives and agents without pumping a solid chemical additive on surface, or the need of any gel to suspend mentioned solids, eliminating the need to handle solids and especially microparticles on location (field, yard, or pad). Many mechanisms for delivering particulates (e.g., N-(phosphonoalkyl)iminodiacetic acid) to a wellbore involve pumping a dispersion or emulsion of the treatment fluid with the solid particulate suspended therein. In contrast, the methods of the present disclosure may be used to provide a liquid fluid additive having a low viscosity compared to any gelled, emulsified, or dispersed fluids. Further, as discussed above, the concentration of the solubilized organic compound comprising a phosphonoalkyl moiety (e.g., N-(phosphonoalkyl)iminodiacetic acid) may be greater than many other forms commonly used for storage and delivery of those compounds. Additionally, the methods of the present disclosure may reduce or eliminate issues and complications associated with emulsified acid fluids due to product quality, friction, and formation (damage) interactions of emulsifying additives with spent fluid. Further, the methods of the present disclosure may provide a safer method of handling the organic compound comprising a phosphonoalkyl moiety (e.g. N-(phosphonoalkyl)iminodiacetic acid) as compared to handling the solid form. Finally, the solubilized form of the organic compound comprising a phosphonoalkyl moiety (e.g., N-(phosphonoalkyl)iminodiacetic acid) may have an approximately neutral pH, thereby reducing reactivity, corrosiveness, and other undesirable interactions.

In certain embodiments, the methods of the present disclosure may be used to form a treatment fluid by combining the fluid additive with an organic or mineral acid, wherein, as described above, the fluid additive comprises an aqueous mixture of an organic salt derivative of an organic compound comprising a phosphonoalkyl moiety. Examples of organic and mineral acids that may be used according to certain embodiments of the present disclosure include, for example, hydrochloric acid, hydrobromic acid, formic acid, acetic acid, chloroacetic acid, dichloroacetic acid, trichloroacetic acid, methanesulfonic acid, citric acid, maleic acid, glycolic acid, lactic acid, malic acid, oxalic acid, sulfamic acid, succinic acid, urea-stabilized or alkylurea derivatives of the halide acids or of oxyanion acids where the oxyanion comprises a central atom selected from one of C, N, P, S, Se, Si, or similar, and any combination thereof. In some embodiments, the acid may be generated from an acid-generating compound. Examples of suitable acid-generating compounds may include, but are not limited to, esters, aliphatic polyesters, orthoesters, poly(orthoesters), poly(lactides), poly(glycolides), poly(ε-caprolactones), poly(hydroxybutyrates), poly(anhydrides), phthalates, terephthalates, ethylene glycol monoformate, ethylene glycol diformate, diethylene glycol diformate, glyceryl monoformate, glyceryl diformate, glyceryl triformate, triethylene glycol diformate, formate esters of pentaerythritol, polyuria or urea polymers, the like, any derivative thereof, and any combination thereof.

In certain embodiments, the organic or mineral acids of the present disclosure may be contained within, or mixed with, a carrier fluid. Suitable carrier fluids for use in certain embodiments of the present disclosure may comprise an aqueous fluid or an oleaginous carrier fluid as their continuous phase. Suitable aqueous carrier fluids may include, for example, fresh water, acidified water, salt water, seawater, brackish water, produced water, flowback water, brine (e.g., a saturated salt solution), or an aqueous salt solution (e.g., a non-saturated salt solution). Aqueous carrier fluids may be obtained from any suitable source. In some embodiments, an organic co-solvent may be included with an aqueous carrier fluid. Suitable organic co-solvents may include, but are not limited to, glycols and alcohol solvents, for example. When present, the amount of the organic co-solvent may range between about 1% to about 50% by volume of the treatment fluid. In other various embodiments, the carrier fluid of the treatment fluids may comprise an oleaginous carrier fluid. Suitable oleaginous carrier fluids may include, for example, an organic solvent, a hydrocarbon, oil, a refined component of oil, or any combination thereof.

In some embodiments, the addition of the organic or mineral acid may cause the organic compound comprising a phosphonoalkyl moiety (e.g., N-(phosphonoalkyl)iminodiacetic acid) to precipitate out of solution into a solid form. For example, taking the same PMIDA solution described above and adding hydrochloric acid may result in the following reaction:

PMIDA(s)+MOH(aq)→PMIDA$^{(n-)}$M$^{(n+)}$(aq)+$H_2O$;+

The above reaction may be an exothermic reaction. The treatment fluids of the present disclosure may be formed by mixing the fluid additive and organic or mineral acid at a wellbore treatment field location or job site. The fluid additive and organic or mineral acid may be mixed after the fluid additive and organic or mineral acid have been pumped to a pressure sufficient to perform the wellbore treatment operation. In certain embodiments, the fluid additive and organic or mineral acid may be introduced into the wellbore separately and mixed after they have been introduced into the wellbore. In some embodiments, the fluid additive and hydrochloric acid may be mixed within the wellbore at or near the portion of the subterranean formation where the treatment operations are to be performed. In other embodiments, the fluid additive and hydrochloric acid may be mixed within the wellbore prior to reaching the portion of the subterranean formation where the treatment operations are to be performed.

In certain embodiments, the organic compound comprising a phosphonoalkyl moiety is at least partially solubilized in the organic or mineral acid. As used herein, the term "at least partially solubilized," and grammatical variants thereof, with reference to the organic compound comprising a phosphonoalkyl moiety in the organic or mineral acid refers to dissolution of at least about 2% weight per volume (w/v) of the organic compound comprising a phosphonoalkyl moiety in the organic or mineral acid at room temperature. As used herein, the term "room temperature" refers to about 15° C. to about 25° C. The remaining excess organic compound comprising a phosphonoalkyl moiety may be suspended in the organic or mineral acid while it is undergoing dynamic fluid flow at room temperature. As temperatures increase (e.g., as the treatment fluid is introduced into a subterranean formation and encounters downhole temperatures), the solubility of the organic compound comprising a phosphonoalkyl moiety in the organic or mineral acid may increase. Indeed, the solubility of the organic compound comprising a phosphonoalkyl moiety increases as a function of acid concentration, and temperature. Table 1 below shows the saturation concentrations of PMIDA in water and several mixtures of HCl at various temperatures.

TABLE 1

Solubility of PMIDA in HCl
Solubility (w/v %)

| Pressure | Solvent | Average 100° F. | Std. Dev. 100° F. | Average 150° F. | Std. Dev. 150° F. | Average 200° F. | Std. Dev. 200° F. |
|---|---|---|---|---|---|---|---|
| 200 psi | $H_2O$ | 1.83 | 0.17 | 2.87 | 0.46 | 5.11 | 0.40 |
|  | 15% HCl | 4.11 | 0.60 | 9.57 | 0.63 | 20.34 | 0.48 |
| Atm. | $H_2O$ | 2.26 | 0.56 | 3.19 | 0.52 | 4.79 | 0.36 |
|  | 15% HCl | 3.06 | 0.59 | 7.22 | 0.58 | 16.60 | 1.19 |
|  | 10% HCl | 2.00 | 0.08 | 4.91 | 0.43 | 10.10 | 0.62 |
|  | 7.5% HCl | 1.74 | 0.07 | 3.97 | 0.25 | 10.00 | 0.61 |

In certain embodiments, the ability of the organic compound comprising a phosphonoalkyl moiety to protect the acid-reactive materials also may increase as a result of the increased temperature and subsequent rise in solubility of the organic compound comprising a phosphonoalkyl moiety in the organic or mineral acid. As discussed above, the addition of the organic salt derivative of the organic compound comprising a phosphonoalkyl moiety to the organic or mineral acid may result in an exothermic reaction. In certain embodiments, the heat generated by the exothermic reaction may increase the solubility of the organic compound comprising a phosphonoalkyl moiety in the organic or mineral acid. In other embodiments, a heater may be used to increase the temperature of the treatment fluid, thereby increasing the solubility of the organic compound comprising a phosphonoalkyl moiety in the organic or mineral acid. In still other embodiments, the temperature of the wellbore or subterranean formation may increase the temperature of the treatment fluid, thereby increasing the solubility of the organic compound comprising a phosphonoalkyl moiety in the organic or mineral acid.

In certain embodiments, the treatment fluid may be a drilling fluid being used to drill a wellbore in an acid-degradable material, such as a carbonate mineral. Accordingly, in such embodiments, the organic compound comprising a phosphonoalkyl moiety or any salt thereof can provide a filter cake that reduces or prevents fluid loss during drilling in much the same manner as that described above. Fluid loss into thief zones also may be reduced or prevented using the additives of the present disclosure in a similar manner. In addition, a protective coating formed using the additives of the present disclosure may leave the wellbore at least partially conditioned against reaction with an acid during subsequent acid-promoted treatment operations.

Illustrative carbonate minerals that may be protected from an organic acid or a mineral acid in various embodiments of the present disclosure include, for example, calcite (calcium carbonate), dolomite (calcium magnesium carbonate), siderite (iron carbonate), aragonite, vaterite, and any combination thereof. Calcite and dolomite may be particularly prevalent in carbonate formations. Optionally, other minerals may be admixed with calcite and/or dolomite in any combination. Other minerals that may be present in a calcite or dolomite surface being protected by the embodiments of the present disclosure include, for example, iron sulfide, iron carbonate, silicates and aluminosilicates including clays.

In certain embodiments, the organic compound comprising a phosphonoalkyl moiety or any salt thereof may be deposited as a coating onto the acid-reactive surface before or while the acid-reactive surface is contacted with the organic or mineral acid. In some embodiments, the coating may be deposited first, and the organic or mineral acid may be contacted with the coated surface thereafter. In other embodiments, the organic compound comprising a phosphonoalkyl moiety, or any salt thereof, and the organic or mineral acid may be contacted with the acid-reactive surface concurrently. Concurrent contact may occur from separate streams of the organic or mineral acid and the organic compound comprising a phosphonoalkyl moiety, or any salt thereof, or these two components may be together in a combined fluid phase, such as a subterranean treatment fluid. In some embodiments, when contacted concurrently with the acid-reactive surface, the organic compound comprising a phosphonoalkyl moiety, or any salt thereof, may be in an insoluble form in a fluid from which it is deposited so as to promote formation of the protective coating. The organic compound comprising a phosphonoalkyl moiety may be fully protonated when in the insoluble form. Even when deposited concurrently in the presence of an organic or mineral acid, a protective coating formed from the organic compound comprising a phosphonoalkyl moiety, or any salt thereof, may still be formed rapidly enough to mitigate erosion of the acid-reactive surface by the organic or mineral acid.

In some embodiments, the protective coating may be deposited from a treatment fluid comprising the organic compound comprising a phosphonoalkyl moiety, or any salt thereof. In a low pH aqueous fluid (e.g., a pH of about 3 or lower, particularly a pH of about 2 or lower), the organic compound comprising a phosphonoalkyl moiety, or any salt thereof, may be relatively insoluble, which may promote its deposition as a protective coating. In certain embodiments, the solubility limit may be decreased at lower pH values, and the time required before precipitation occurs may vary depending upon the pH and the initial concentration. In some embodiments, the pH also may be adjusted to promote metal ion complexation on the acid-reactive surface without promoting excessive dissolution of the metal complex in order to form a protective coating comprising the metal complex. Illustrative treatment fluids in which the organic compound comprising a phosphonoalkyl moiety, or any salt thereof, may be present include, for example, acidizing fluids, fracturing fluids, drilling fluids, breaker fluids, and the like.

In certain embodiments, the pH of the treatment fluid may be chosen such that the organic compound comprising a phosphonoalkyl moiety is initially fully protonated. Alternatively, in some embodiments, the pH may be chosen such that one or more of the acid groups of the organic compound comprising a phosphonoalkyl moiety is deprotonated. When fully protonated at low pH values, the organic compound comprising a phosphonoalkyl moiety may initially be insoluble in the treatment fluid. That is, the organic compound comprising a phosphonoalkyl moiety may be suspended in the treatment fluid. In certain embodiments, a salt of the organic compound comprising a phosphonoalkyl moiety similarly may be suspended in the treatment fluids of the present disclosure. As indicated above, placing the organic compound comprising a phosphonoalkyl moiety or any salt thereof in suspended form in the treatment fluid may promote formation of a protective coating according to the embodiments of the present disclosure. In some embodiments, when deposited from a suspension, the organic compound comprising a phosphonoalkyl moiety, or any salt thereof, may initially be incapable of promoting complexation of a metal ion. However, as the treatment fluid spends and the pH rises, the organic compound comprising a phosphonoalkyl moiety may become at least partially deprotonated and capable of complexing a metal ion. In certain embodiments, a protective coating comprising the metal complex may be formed as the pH rises. The organic compound comprising a phosphonoalkyl moiety, or a complex thereof, may also increase in solubility as the pH further increases. In some embodiments, at pH values of about 3.5 or above, the protective coating comprising the organic compound comprising a phosphonoalkyl moiety, or any salt thereof, may be removed from the acid-reactive surface, as indicated above.

In certain embodiments, the protective coating may be deposited at a pH of about 3 or lower, or about 2 or lower. In other embodiments, the protective coating may be deposited at a pH ranging between about 0 and about 2.5, or between about 0.5 and about 2.5, or between about 1 and about 2.5, or between about 1 and about 2, or between about 1.5 and about 2.5, or between about 1.5 and about 2, or between about 1.5 and about 2.5.

As indicated above, in some embodiments, the protective coating on the acid-reactive surface may divert an organic or mineral acid from a first location in the wellbore where the protective coating is deposited to a second location in the wellbore. The second location may be substantially lacking in the protective coating so that an acid-reactive surface or substance there may undergo reaction with the organic or mineral acid. In some embodiments, the first location in the wellbore may comprise the near-wellbore area, such as the walls of the wellbore, and the second location in the wellbore may comprise a portion of the subterranean formation radially offset from the walls of the wellbore (i.e., deeper in the subterranean formation). This can allow stimulation to occur deeper within the subterranean formation instead of spending of the organic or mineral acid in the near-wellbore area, possibly accompanied by subterranean formation damage. In other embodiments, the first location in the wellbore may comprise an interval that is nearer the upper terminus of the wellbore and the second location may comprise an interval that is more removed from the upper terminus of the wellbore, such as in bullheading operations. In still other embodiments, the first location in the wellbore may comprise an interval that is farther away from the upper terminus of the wellbore and the second location may comprise an interval that is nearer the upper terminus of the wellbore. In either case, the protective coating may allow an organic or mineral acid to be diverted from the first interval to the second interval in order to allow stimulation of the second interval to occur, for example. In still other embodiments, the first location in the wellbore may comprise an interval of the subterranean formation, and the second location may comprise an acid-reactive substance within the wellbore itself, such as an acid-degradable gel or an acid-degradable filter cake.

In certain embodiments, the protective coating may divert fluid away from a thief zone in the subterranean formation. Thief zones can be laminated or completely separated at a distance from one another across the entire interval of interest. Protection against fluid loss into a thief zone can be particularly desirable during a drilling operation.

In certain embodiments, the methods of the present disclosure may comprise reacting the organic or mineral acid with an acid-reactive substance or surface at the second location. The acid-reactive substance or surface at the second location may comprise the same acid-reactive substance or surface present at the first location, or it may be different. Illustrative acid-reactive materials that may react at the second location include, for example, the formation matrix, scale, an acid-degradable filter cake, or an acid-degradable polymer gel in the wellbore.

In still other embodiments, the methods of the present disclosure may comprise removing the protective coating from the acid-reactive surface. In some embodiments, removing the protective coating from the acid-reactive surface may comprise contacting the protective coating with an aqueous fluid having a pH of about 5 or greater. Below this pH value, particularly below a pH of about 3, the organic compound comprising a phosphonoalkyl moiety, any salt thereof, or any complex thereof, may remain substantially insoluble, and the protective coating may remain intact. In some embodiments, the protective coating may be removed at mildly acidic pH values, such as a pH of about 5 to about 7, or about 5.5 to about 7, or about 6 to about 7. At these pH values, the acid's reactivity toward the acid-reactive surface may be considerably reduced over that of more concentrated acid solutions. In other embodiments, the protective coating may be removed at neutral to alkaline pH values, such as a pH value of about 7 to about 12, or about 7 to about 10, or about 7 to about 9.

In certain embodiments, the concentration of the organic compound comprising a phosphonoalkyl moiety, or any salt thereof, in the treatment fluid may range between about 0.5 wt. % to about 70 wt. %. In other embodiments, the concentration may range between about 1 wt. % and about 25 wt. %. In still other embodiments, the concentration may range between about 1.5 wt. % and about 20 wt. %, or from about 3% to 18%, or from about 5% to 12%, or from about 7% to 10%. Depending on the pH of the treatment fluid and the concentration, the organic compound comprising a phosphonoalkyl moiety, or any salt thereof, may be substantially soluble in the treatment fluid, or it may be at least partially suspended in the treatment fluid. When suspended, it may be possible to deposit the protective coating as a filter cake on an acid-reactive surface or substance when treating a subterranean formation. Treatment fluids comprising a solubilized organic compound comprising a phosphonoalkyl moiety, or any salt thereof, may be used to directly form a metal complex upon the acid-reactive surface.

In additional embodiments, the treatment fluids described herein may further comprise any number of additives that are commonly used in downhole operations including, for example, silica scale control additives, corrosion inhibitors, corrosion inhibitor intensifiers, surfactants, viscoelastic surfactants, surface modification agents and tackifying agents, surface and tensioactive agents, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, proppants or other particulates, particulate diverters of inorganic or organic properties of synthetic or industrial production, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, biocides, catalysts, clay stabilizers, breakers, delayed release breakers, energizing fluids (e.g., $CO_2$, $N_2$, $CH_4$, $C_2H_6$, propane, butane, LNG), anti-sludging agents, thinners, solvents and co-solvents, freezing point depressants, microemulsions, diverting agents and particulates including microparticulates, proppant and microproppants including natural sands, polymeric and macromolecular permeability modifiers (relative permeability modifiers), crosslinkers (organic and inorganic), complexing and chelating agents, and the like. Any combination of these additives may be used as well. One of ordinary skill in the art will be able to formulate a treatment fluid having properties suitable for a given application.

Figure 1:
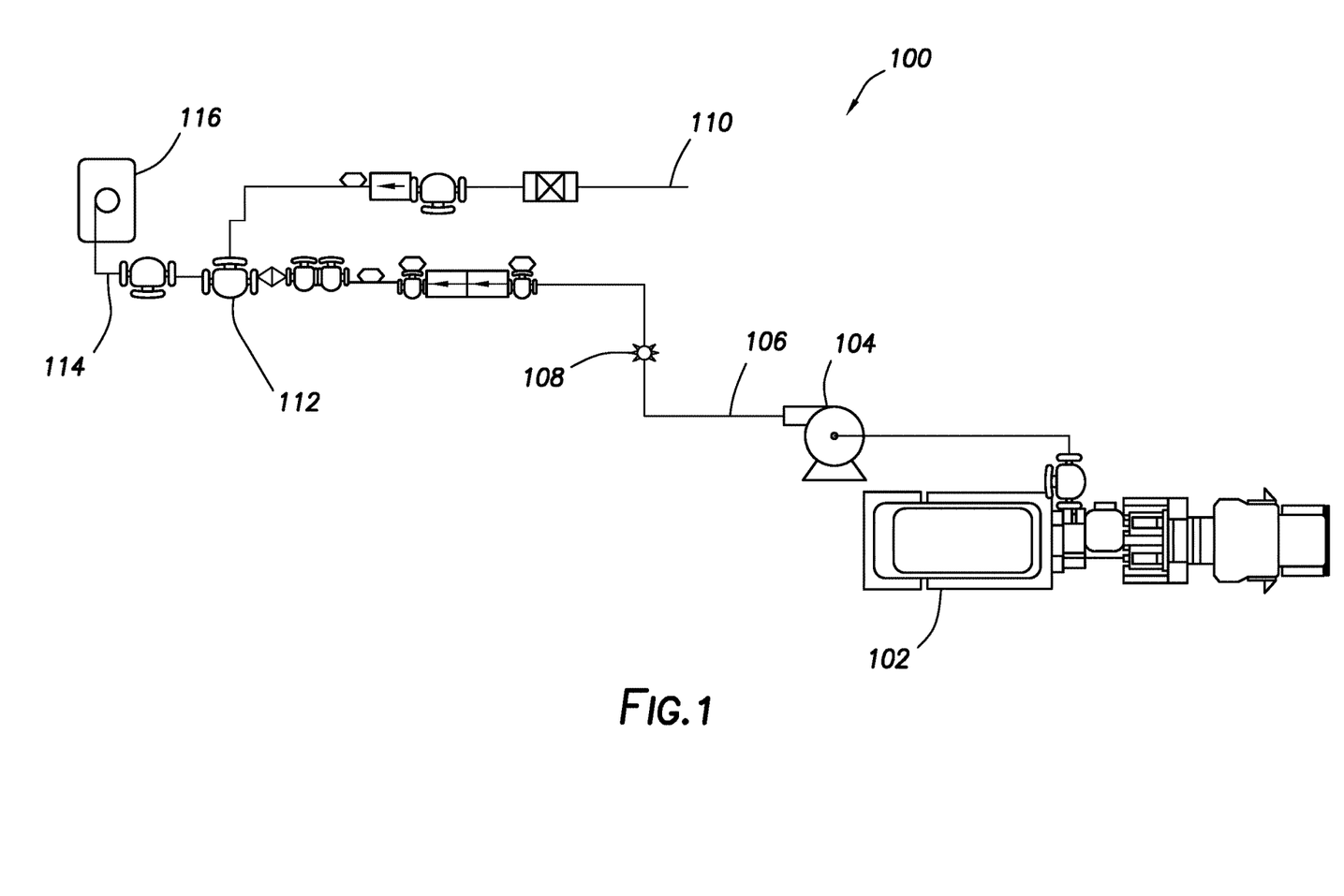
FIG. 1 is a schematic representation an example of a fluid additive unit and delivery assembly that may be used in accordance with certain embodiments of the present disclosure.

In certain embodiments, systems configured for delivering a treatment fluid of the present disclosure to a downhole location are described herein. FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 100 may include fluid additive unit 102 in which a fluid additive of the present disclosure may be stored. In certain embodiments, fluid additive unit 102 may be coupled to pump 104. In other embodiments, fluid additive unit 102 may contain 104 built into fluid additive unit 102. In some embodiments, pump 104 may be a high-pressure pump. As used herein, the term "high pressure pump" will refer to a pump that is capable of delivering a fluid downhole at a pressure of about 1000 psi or greater. A high-pressure pump may be used when it is desired to introduce a treatment fluid of the present disclosure to a subterranean formation at or above a fracture gradient of the subterranean formation (e.g., at or above a pressure sufficient to create one or more fractures within the subterranean formation), but it may also be used in cases where fracturing is not desired. The treatment fluids described herein may be introduced with a high-pressure pump, or they may be introduced following a treatment fluid that was introduced with a high-pressure pump. In some embodiments, the high-pressure pump may be capable of fluidly conveying particulate matter into the subterranean formation. Suitable high-pressure pumps will be known to one having ordinary skill in the art and may include, but are not limited to, floating piston pumps and positive displacement pumps. In other embodiments, pump 104 may be a low-pressure pump. As used herein, the term "low pressure pump" will refer to a pump that operates at a pressure of about 1000 psi or less. In some embodiments, a low-pressure pump may be fluidly coupled to a high-pressure pump that is fluidly coupled to the tubular. That is, in such embodiments, the low-pressure pump may be configured to convey the treatment fluid to the high-pressure pump. In such embodiments, the low-pressure pump may "step up" the pressure of a treatment fluid before it reaches the high-pressure pump. Alternately, in other embodiments, the low-pressure pump may be used to directly introduce the treatment fluid to the subterranean formation.

In some embodiments, pump 104 may discharge into fluid additive line 106. In some embodiments, fluid flow meter 108 may be installed in fluid additive line 106. A person of ordinary skill in the art would understand that fluid flow meter 108 may be used to monitor the flow rate of the fluid additive as it is being added to the wellbore. The system 100 may also comprise acid line 110. Acid line 110 may be used to transport the organic or mineral acids of the present disclosure to the wellbore from storage and pumping components (not expressly shown). As discussed above, in some embodiments, the fluid additive and the organic or mineral acid of the present disclosure may be mixed prior to introduction into the wellbore. In such embodiments, as depicted in FIG. 1, fluid additive line 106 and acid line 110 may be combined at fluid mixer 112. Fluid mixer 112 may be coupled to wellbore feed line 114. Wellbore feed line 114 may be coupled to the entrance of wellbore 116. It is to be recognized that system 100 is merely one embodiment and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Figure 2:
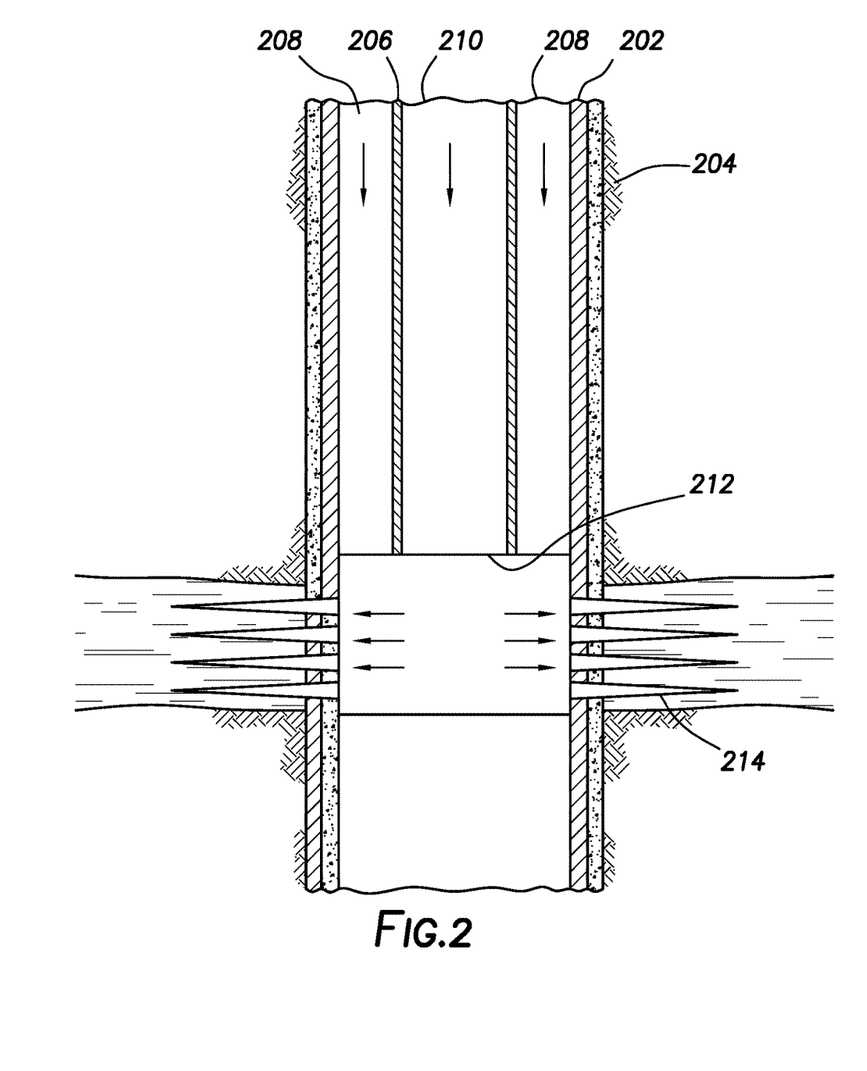
FIG. 2 is a schematic representation of an example of a wellbore fluid additive mixing assembly that may be used in accordance with certain embodiments of the present disclosure.

In other embodiments, the fluid additive and the organic or mineral acid may be mixed in the wellbore. FIG. 2 shows an illustrative depiction of an embodiment of the present disclosure wherein the fluid additive and the organic or mineral acid of the present disclosure are mixed within the wellbore. Casing 202 is shown penetrating a portion of subterranean formation 204. Tubing string 206 is shown disposed within a portion of casing 202. In certain embodiments, the organic or mineral acid may be pumped into the wellbore through the annulus 208 between the casing 202 and the tubing string 206. Likewise, the fluid additive may be pumped into the wellbore through the interior portion 210 of the tubing string. The fluid additive and the organic or mineral acid of the present disclosure may then be mixed to form a treatment fluid at the terminal end 212 of tubing string 206. The treatment fluid may then be introduced into the subterranean formation 204 at one or more treatment zones 214.

It is also to be recognized that the disclosed treatment fluids also may directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1 and 2.

An embodiment of the present disclosure is a method that includes: providing a fluid additive including an organic compound and a base, wherein the organic compound includes a phosphonoalkyl moiety; providing an acid or acid generating source; mixing at least the fluid additive and the acid or acid generating source to form a treatment fluid; and introducing the treatment fluid into at least a portion of a subterranean formation.

In one or more embodiments described in the preceding paragraph, the method further includes contacting at least a portion of an acid-reactive substance disposed with the subterranean formation with the treatment fluid; and allowing the treatment fluid to deposit a protective coating comprising the organic compound or an organic salt derivative thereof onto the acid-reactive surface. In one or more embodiments described above, the acid or acid generating source includes an acid selected from the group consisting of: hydrochloric acid; hydrobromic acid; formic acid; acetic acid; chloroacetic acid; dichloroacetic acid; trichloroacetic acid; methanesulfonic acid; citric acid; maleic acid; glycolic acid; lactic acid; malic acid; oxalic acid; sulfamic acid; succinic acid; urea-stabilized or alkylurea derivatives of a halide acid or an oxyanion acid; and any combination thereof. In one or more embodiments described above, the organic compound includes a salt of an organic acid, and the salt of an organic acid is present in the fluid additive in an aqueous solution. In one or more embodiments described above, the salt of an organic acid is present in the aqueous solution in an amount of greater than or equal to about 55% w/v. In one or more embodiments described above, the organic compound is selected from the group consisting of: an N-(phosphonoalkyl)iminodiacetic acids; N-(carboxymethyl)-N-(phosphonomethyl)-glycine; glycine, N,N'-1,2-ethanediylbis(N-(phosphonomethyl); glyphosine; aminotrimethylene phosphonic acid; sodium aminotris(methylenephosphonate); N-(2-hydroxyethyl)imino-bis(methylphosphonic acid); phosphonic acid, P,P'-((2-propen-1-ylimino)bis(methylene))bis-; phosphonic acid, P,P',P'''-(nitrilotris(methylene))tris-; (nitrilotris(methylene))trisphosphonic acid; ((methylimino)dimethylene)bisphosphonic acid; phosphonic acid, P,P',P''',P''''-(oxybis(2,1-ethane-diylnitrilobis(methylene))tetrakis-; ((propylimino)bis(methylene))diphosphonic acid; phosphonic acid; P,P',P'''-(nitrilotris(methylene))tris-; (ethylenedinitrilo)-tetramethylenephosphonic acid; ethylenebis(nitrilodimethylene)tetraphosphonic acid; (ethylenebis(nitrilobis¬(methylene)))-tetrakisphosphonic acid; tetrasodium tetrahydrogen (ethane-1,2-diylbis(nitrilobis¬(methylene))-tetrakisphosphonate; 6-(bis(phosphonomethyl)amino)hexanoic acid; (phenyl¬methyl)imino-bis(methylene)bisphosphonic acid; a sodium, potassium, or ammonium salt of any group member herein, and any combination thereof. In one or more embodiments described above, the organic compound is an N-(phosphonoalkyl) iminodiacetic acid. In one or more embodiments described above, the N-(phosphonoalkyl)iminodiacetic acid is PMIDA. In one or more embodiments described above, the base is a Brønsted base. In one or more embodiments described above, the step of providing the fluid additive comprising the organic compound and the base fluid additive further includes adding the organic compound to an excess quantity of the base.

Another embodiment of the present disclosure is a system that includes: a fluid additive unit containing a fluid additive including an organic compound or a salt of the organic compound, and a base, wherein the organic compound includes a phosphonoalkyl moiety; and an acid delivery line.

In one or more embodiments described in the preceding paragraph, the system further includes a mixer coupled to the fluid additive unit and the acid delivery line. In one or more embodiments described above, the system further includes a tubular string disposed within a casing in at least a portion of a wellbore. In one or more embodiments described above, the acid delivery line provides an acid or acid generating source to an annulus of the casing and the fluid additive is provided to the annulus of the casing using the tubular string.

Another embodiment of the present disclosure is a method that includes: adding PMIDA to potassium hydroxide or sodium hydroxide, or any combination thereof, to form a fluid additive; mixing at least the fluid additive with a fluid including hydrochloric acid to form a treatment fluid; and introducing the treatment fluid into at least a portion of a subterranean formation.

In one or more embodiments described in the preceding paragraph, the method further includes the steps of contacting at least a portion of an acid-reactive substance disposed within the subterranean formation with the treatment fluid; and allowing the treatment fluid to deposit a protective coating comprising the PMIDA onto the acid-reactive surface. In one or more embodiments described above, the method further includes the step of increasing a temperature of the treatment fluid using a heater. In one or more embodiments described above, the method further includes the step of increasing a temperature of the treatment fluid by introducing the treatment fluid into a portion of the subterranean formation comprising an elevated temperature. In one or more embodiments described above, the fluid additive includes an aqueous solution of the base and an organic acid salt of the PMIDA. In one or more embodiments described above, the organic salt of the PMIDA is present in the aqueous solution in an amount of greater than or equal to about 55% w/v.

To facilitate a better understanding of the embodiments of the present disclosure, the following examples of preferred or representative embodiments are given. In no way should the following examples be read to limit, or to define, the scope of the disclosure.

EXAMPLES

PMIDA Added to Base Solubility Test

Several experiments were run to demonstrate the solubility of PMIDA in various bases. During the testing, however, it was observed that adding the base to the PMIDA in its solid form, or in a high concentrated slurry, was unsuccessful. For example, performing the steps in this direction was observed to result in a crashed sample wherein the PMIDA was substantially insoluble in the base mixture.

Surprisingly, performing the steps in the opposite direction, e.g., adding the PMIDA to the base, resulted in successful samples. The following procedure was followed to generate several samples. First, a quantity of a known base in water was prepared. Next, PMIDA was added to the solution at a rate slow enough to ensure that no boiling of the fluid occurred. As discussed above, it is believed that the addition of the PMIDA to the base may result in an exothermic reaction that may aid in additional solubilizing of PMIDA due to the increase in the fluid temperature. After complete addition and thorough mixing, the fluid was cooled, and the volume, weight, and pH were measured.

Finally, the concentration and density of the samples were determined. Table 2 below shows the results of these samples.

TABLE 2

Neutralized PMIDA Salt Concentrations

| Sample | PMIDA (g) | Base (mL) | PMIDA % final concentration (w/v) | pH | Density (g/mL) |
|---|---|---|---|---|---|
| #1 (KOH 45% w/w) | 28.67 | 26.5 | 63.7% | 6.6 | 1.43 |
| #2 (KOH 45% w/w) | 86.01 | 79.5 | 64.7% | 6.4 | 1.45 |
| #3 (KOH 45% w/w) | 86.01 | 79.5 | 63.7% | 6.5 | 1.46 |
| #4 (KOH 45% w/w) | 26.06 | 26.5 | 63.8% | 6.5 | 1.45 |
| #5 (NaOH 48% w/w) | 13.66 | 22.0 | 45.5% | 6.6 | 1.33 |
| #6 (KOH 48% w/w) | 28.67 | 26.5 | 70.6% | 6.2 | 1.48 |
| #7 (KOH 48% w/w, NaOH 48% w/w, and DI Water) | 28.67 | 16.8 KOH, 8.4 NaOH, and 1.5 DI Water | 65.2% | 7.3 | 1.48 |

Core Flow Test

A previously prepared core measuring 1.5"×6" (diameter× length) was placed in a Viton Duro 90 rubber sleeve and inserted into a custom designed Hassler cell. Mandrels were inserted into the sleeve ends, loosely tightened to the core face and injection/effluent flow lines were connected. The entire Hassler apparatus was placed in a "tube" oven, overburden flow lines attached, and a thermocouple placed on the interior of the cell to monitor injection fluid and core temperature. The cell was then heated to the desired temperature, which was regulated with a Eurotherm regulator by means of a proportional-integral-derivative routine using an internal oven and external J-type thermocouple. During the entirety of the tests, a dome-top pressure regulated back-pressure regulator was set to 1,000 psi to maintain $CO_2$ byproducts in solution. Annular pressure was set, 2,750 psi by means of an ISCO dual-piston pump to help prevent any unnecessary flow around the core and to ensure all fluids passed through the core.

After reaching the desired temperature, 2% KCl was flowed through the core until stable brine permeability was maintained as determined from a differential pressure ($\Delta P$) reading measured from a Honeywell diaphragm differential pressure transducer. The fluid was switched to the reactive fluid (consisting of the solubilized PMIDA which was teed into a stream of HCl at a rate to give a 15% HCl equivalent and a 5% protonated PMIDA equivalency) and the lines were purged to remove the previous brine fluid and to enable the reactive fluid was nearest to the core face as possible. The flow valves were then returned to normal operation and flow was continued and passed through the core.

Figure 3:
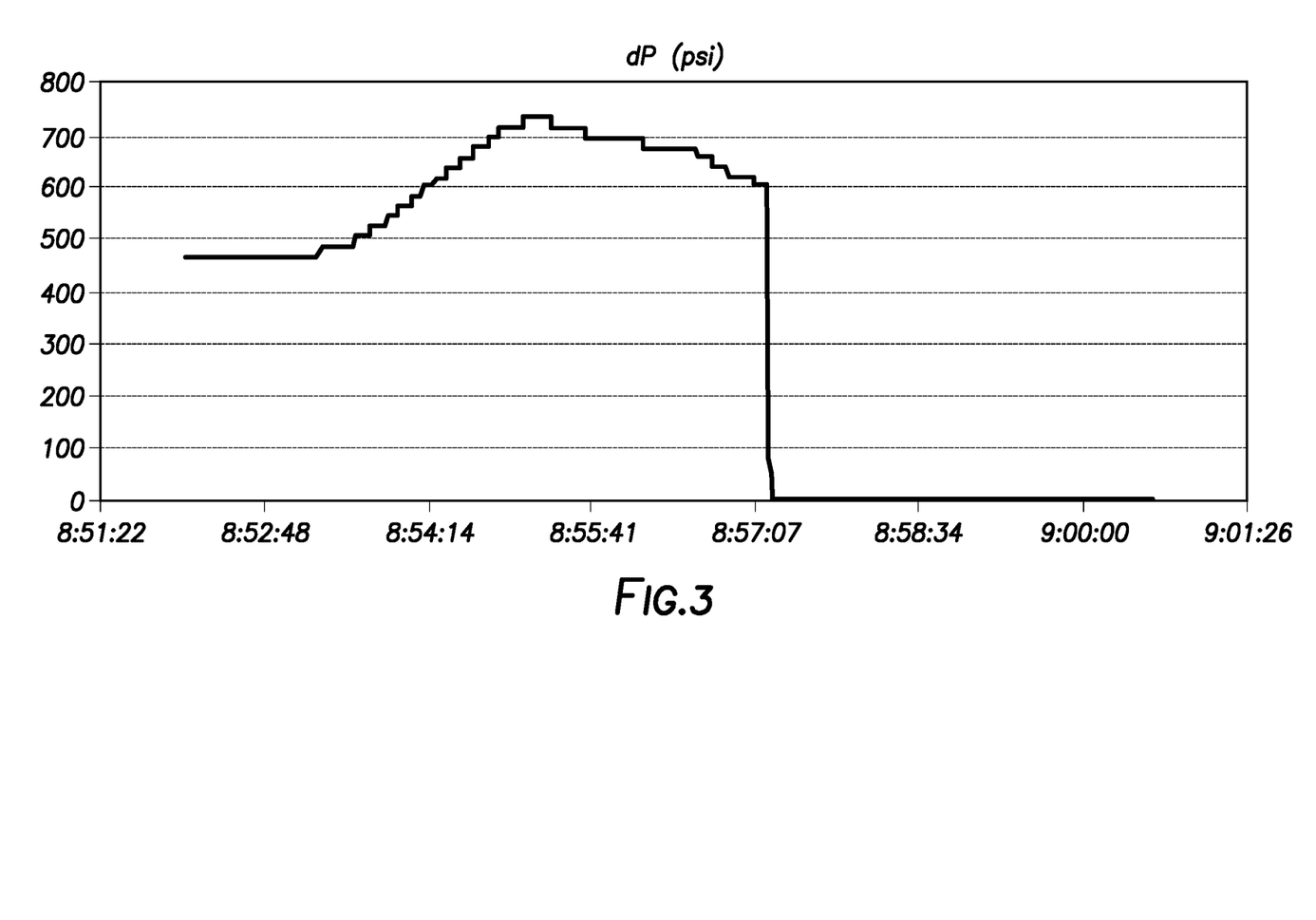
FIG. 3 is a diagram showing differential pressure results from a core test sample in accordance with certain embodiments.
Figure 4:
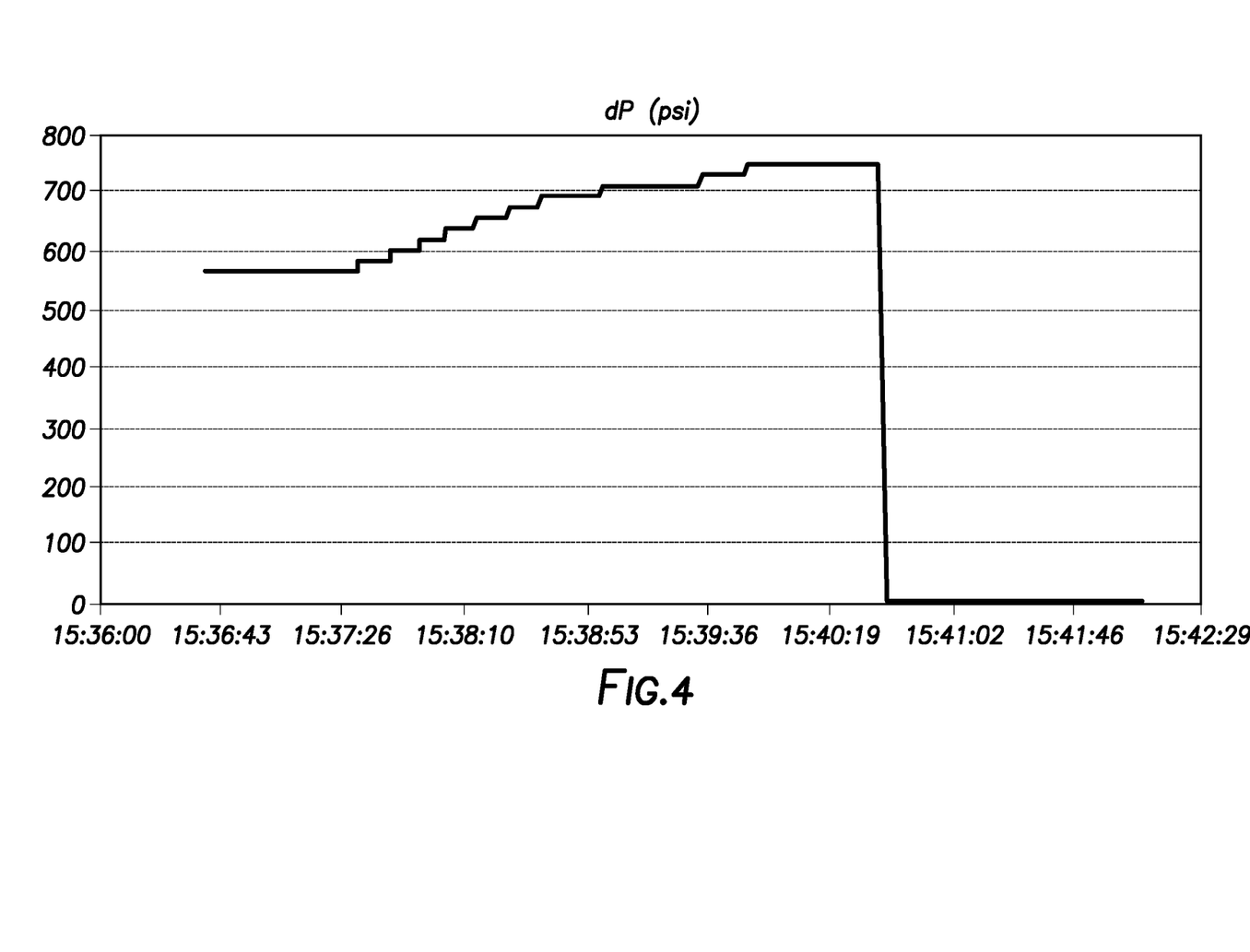
FIG. 4 is a diagram showing differential pressure results from a core test sample in accordance with certain embodiments.

The initial permeability ($K_i$), as well as the final ($K_f$), to the respective brine was determined from the core dimensions, fluid viscosity at temperature, pressure differential ($\Delta P$), and associated flow rate, as dictated by Darcy's law for laminar flow in a porous media. The $\Delta P$ was monitored during the entire course of the treatment and, during each test, an initial increase in $\Delta P$ was noted, which indicated the diverting acid contacted and was passing through the permeable matrix. Upon completion of the test, the reactive fluid was again switched back to brine, with lines purged to help ensure minimal to no additional reactive fluid passed into the core. The flow valves were reopened and allowed to flow brine through the core until a stable post-treatment permeability ($K_f$) was maintained. Results of the new test method using the fluid additives of the present disclosure were compared to previous methods, consisting of a gelled slurry of PMIDA (solid) suspended in a xanthan based gel (30 pounds per thousand) with a 15% HCl loading delivered and pumped into the core as a single fluid package, were essentially identical. Previous methods using a carbonate core resulted in a pore volume to breakthrough ("PVbt") of 0.50 as demonstrated by the differential pressure readings shown in FIG. 3. The new, solubilized dual injection method gave a PVbt of 0.43 as demonstrated by the differential pressure readings shown in FIG. 4. A person of ordinary skill in the art would understand that these measurements are within the confines of experimental deviation commonly observed from the heterogeneous nature of carbonate source rock.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
    providing a fluid additive comprising a Bronsted base and an organic compound that comprises a phosphonoalkyl moiety, wherein the fluid additive does not comprise a gel;
    providing an acid;
    mixing at least the fluid additive and the acid to form a treatment fluid; and
    introducing the treatment fluid into at least a portion of a subterranean formation.

2. The method of claim 1 further comprising:
    contacting at least a portion of an acid-reactive substance disposed with the subterranean formation with the treatment fluid; and
    allowing the treatment fluid to deposit a protective coating comprising the organic compound or an organic salt derivative thereof onto the acid-reactive surface.

3. The method of claim 1, wherein the acid comprises an acid selected from the group consisting of: hydrochloric acid; hydrobromic acid; formic acid; acetic acid; chloroacetic acid; dichloroacetic acid; trichloroacetic acid; methanesulfonic acid; citric acid; maleic acid; glycolic acid; lactic acid; malic acid; oxalic acid; sulfamic acid; succinic acid; and any combination thereof.

4. The method of claim 1, wherein the organic compound is selected from the group consisting of: an N-(phosphonoalkyl)iminodiacetic acids; N-(carboxymethyl)-N-(phosphonomethyl)¬glycine; glycine, N,N'-1,2-ethanediylbis(N-(phosphonomethyl); glyphosine; aminotrimethylene phosphonic acid; sodium aminotris(methylenephosphonate); N-(2-hydroxyethyl)imino¬bis(methylphosphonic acid); phosphonic acid, P,P'-((2-propen-1-ylimino)bis(methylene))bis-; phosphonic acid, P,P',P''-(nitrilotris(methylene)) tris-; (nitrilotris(methylene))trisphosphonic acid; ((methylimino)dimethylene)bisphosphonic acid; phosphonic acid, P,P',P'',P'''-(oxybis(2,1-ethane-diylnitrilobis(methylene))tetrakis-; ((propylimino)bis(methylene))diphosphonic acid; phosphonic acid; P,P',P'''-(nitrilotris(methylene))tris-; (ethylenedinitrilo)-tetramethylenephosphonic acid; ethylenebis (nitrilodimethylene)tetraphosphonic acid; (ethylenebis(nitrilobis¬(methylene)))-tetrakisphosphonic acid; tetrasodium tetrahydrogen (ethane-1,2-diylbis(nitrilobis¬(methylene)))-tetrakisphosphonate; 6-(bis(phosphonomethyl)amino) hexanoic acid; (phenyl¬methyl)imino)-bis(methylene) bisphosphonic acid; a sodium, potassium, or ammonium salt of any group member herein, and any combination thereof.

5. The method of claim 4, wherein the organic compound is an N-(phosphonoalkyl)iminodiacetic acid.

6. The method of claim 5, wherein the N-(phosphonoalkyl)iminodiacetic acid is PMIDA.

7. The method of claim 1, wherein providing the fluid additive comprising the organic compound and the Brønsted base further comprises adding the organic compound to an excess quantity of the Brønsted base.

8. A method comprising:
    adding PMIDA to potassium hydroxide or sodium hydroxide, or any combination thereof, to form a liquid fluid additive, wherein the liquid fluid additive does not comprise a gel;
    mixing at least the liquid fluid additive with a fluid comprising hydrochloric acid to form a treatment fluid; and
    introducing the treatment fluid into at least a portion of a subterranean formation.

9. The method of claim 8 further comprising:
    contacting at least a portion of an acid-reactive substance disposed within the subterranean formation with the treatment fluid; and
    allowing the treatment fluid to deposit a protective coating comprising the PMIDA onto the acid-reactive surface.

10. The method of claim 8, further comprising increasing a temperature of the treatment fluid using a heater.

11. The method of claim 8, further comprising increasing a temperature of the treatment fluid by introducing the treatment fluid into a portion of the subterranean formation.

12. The method of claim 1, further comprising increasing a temperature of the treatment fluid using a heater.

13. A method comprising:
    providing a fluid additive comprising an alkali hydroxide and an organic compound that comprises a phosphonoalkyl moiety, wherein the fluid additive does not comprise a gel; providing an acid;
    mixing at least the fluid additive and the acid to form a treatment fluid; and
    introducing the treatment fluid into at least a portion of a subterranean formation.

14. The method of claim 13, wherein the treatment fluid is substantially free of a solid particulate.

15. The method of claim 8, wherein the liquid fluid additive consists essentially of PMIDA and potassium hydroxide or sodium hydroxide, or any combination thereof.

16. The method of claim 8, wherein the treatment fluid is an acidic treatment fluid for acidizing at least a portion of the subterranean formation.

* * * * *